US009889903B2

(12) United States Patent
McNeeley et al.

(10) Patent No.: US 9,889,903 B2
(45) Date of Patent: Feb. 13, 2018

(54) LOWER FORK EXTENDER ADAPTER

(71) Applicants: Misty Michelle McNeeley, Smyrna, GA (US); Dennis Eugene McNeeley, Acworth, GA (US)

(72) Inventors: Misty Michelle McNeeley, Smyrna, GA (US); Dennis Eugene McNeeley, Acworth, GA (US)

( * ) Notice: Subject to any disclaimer, the term of this patent is extended or adjusted under 35 U.S.C. 154(b) by 0 days.

(21) Appl. No.: 15/209,325

(22) Filed: Jul. 13, 2016

(65) Prior Publication Data

US 2017/0015379 A1 Jan. 19, 2017

Related U.S. Application Data

(60) Provisional application No. 62/191,659, filed on Jul. 13, 2015.

(51) Int. Cl.
*B62K 11/02* (2006.01)
*B60R 13/00* (2006.01)
*B62K 25/02* (2006.01)

(52) U.S. Cl.
CPC .............. *B62K 11/02* (2013.01); *B60R 13/00* (2013.01); *B62K 25/02* (2013.01)

(58) Field of Classification Search
CPC .................................................... B62K 25/02
See application file for complete search history.

(56) References Cited

U.S. PATENT DOCUMENTS

| 4,327,928 | A | * | 5/1982 | Chalmers | B62K 25/08 280/277 |
| 4,585,245 | A | * | 4/1986 | Rose | B62K 25/06 280/277 |
| D737,731 | S | * | 9/2015 | McNeeley | D12/118 |
| D738,265 | S | * | 9/2015 | McNeeley | D12/118 |

OTHER PUBLICATIONS

Harley-Davidson Fork Slider End Cover Instructions, http://www.harley-davidson.com/en_US/Media/downloads/Service/isheets/-J03907.pdf, Jan. 2007.

* cited by examiner

*Primary Examiner* — Kevin Hurley
(74) *Attorney, Agent, or Firm* — Randy R. Schoen

(57) ABSTRACT

Various examples are provided for adaption of a front fork of a motorcycle. In one example, an adapter includes a slot extending inward from a proximal end of the adapter; axle openings on opposite sides of the adapter; and access openings extending inward from a distal end of the adapter to the slot. The slot can be configured to align with an end of a fork leg assembly of a motorcycle and the axle openings can be configured to align with an axle channel of the fork leg assembly. The access openings can provide access to fasteners of the fork leg assembly. In another example, a method includes positioning an adapter on the end of the fork leg assembly, inserting an axle into an axle channel through axle openings of the adapter, and securing the end cap onto the axle using fasteners accessible through openings of the adapter.

20 Claims, 9 Drawing Sheets

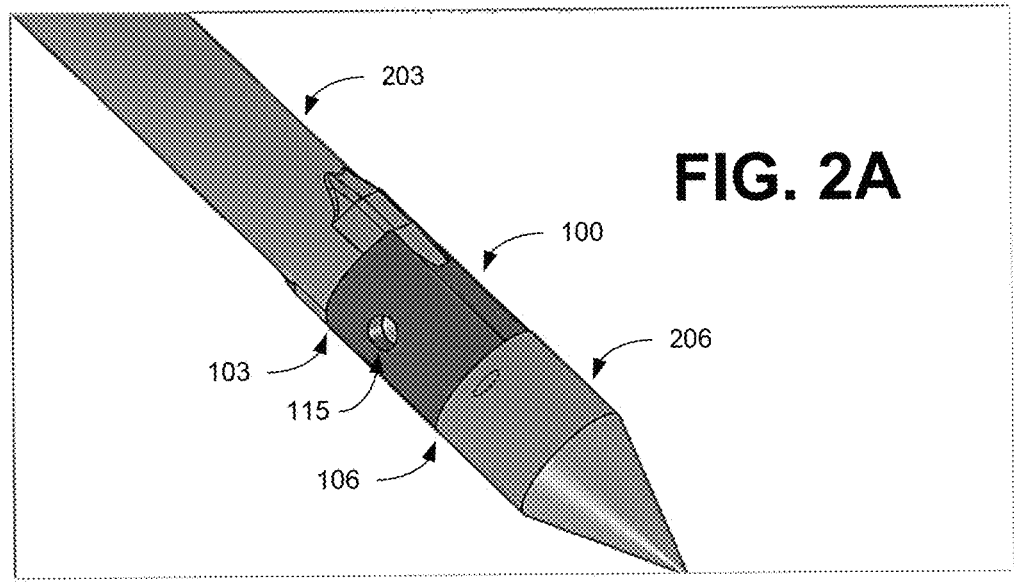
FIG. 2A
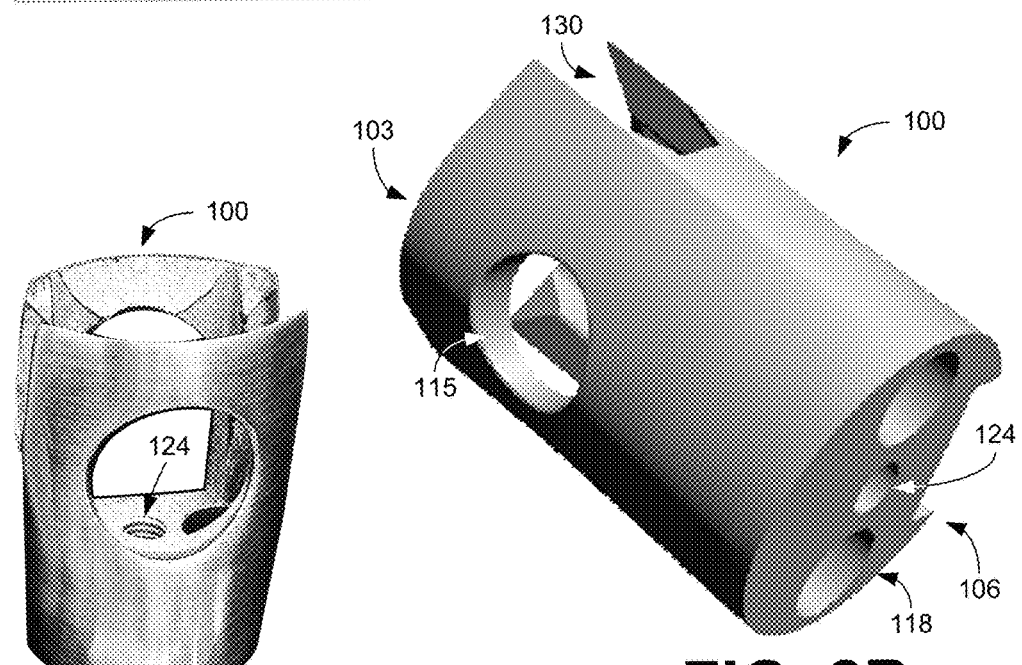
FIG. 2C
FIG. 2B

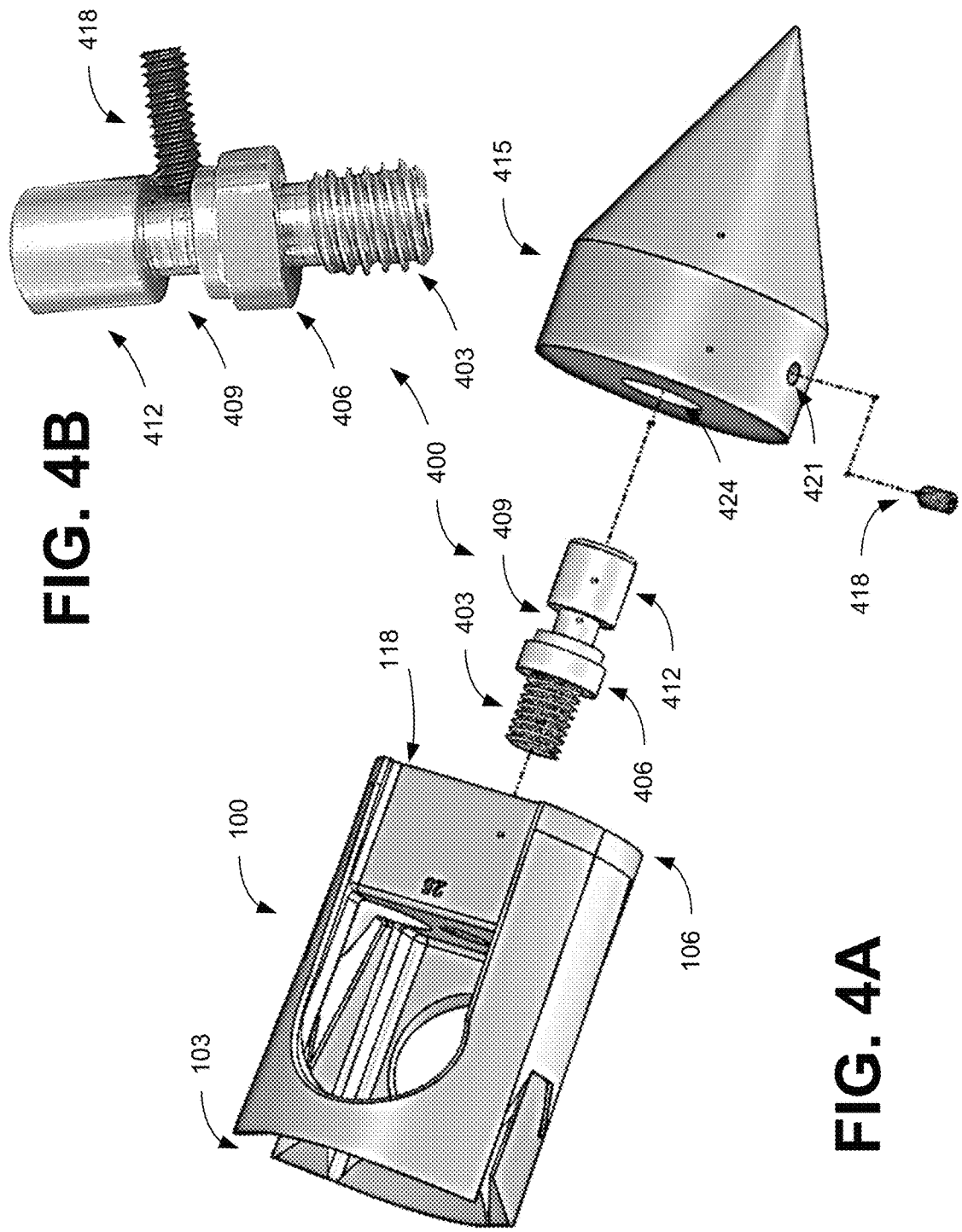

LOWER FORK EXTENDER ADAPTER

CROSS REFERENCE TO RELATED APPLICATIONS

This application claims priority to, and benefit of, U.S. provisional application entitled "LOWER FORK EXTENDER ADAPTER" having Ser. No. 62/191,659, filed Jul. 13, 2015, which is hereby incorporated by reference in its entirety.

BACKGROUND

Vehicles are often personalized to the owner's or user's taste by adding ornamentation of other attachments. This is equally true for motorcycles, which can be modified in many ways. For example, ornamentation can be added to the fork of the motorcycle. In some cases, the ends of the fork need to be modified to allow for their mounting.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A and 2B include a perspective view of the lower fork extender adapter of FIGS. 1A-1C mounted on a motorcycle fork leg assembly and an enlarged perspective view of the lower fork extender adapter of FIGS. 1A-1C in accordance with various embodiments of the present disclosure.

FIG. 2C is an image of an example of a fabricated lower fork extender adapter of FIGS. 1A-1C in accordance with various embodiments of the present disclosure.

FIGS. 4A through 4C illustrate the attachment of an ornamental or decorative piece to the lower fork extender adapter of FIGS. 1A-1C in accordance with various embodiments of the present disclosure.

DETAILED DESCRIPTION

Figure 1A:
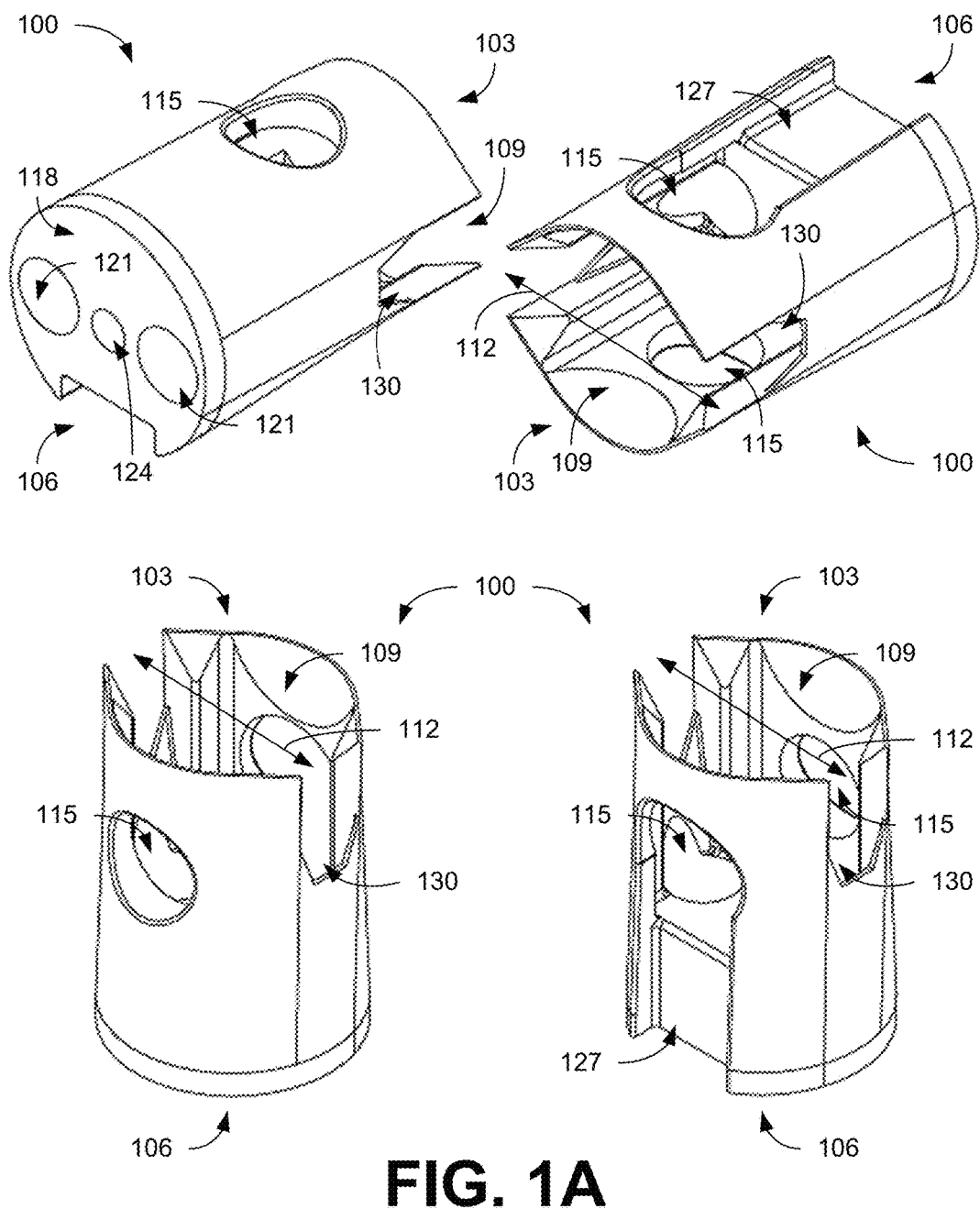
FIGS. 1A through 1C are various views illustrating an example of a lower fork extender adapter in accordance with various embodiments of the present disclosure.

Disclosed herein are various embodiments of methods and adapters related to adaption of a front fork of a motorcycle. Reference will now be made in detail to the description of the embodiments as illustrated in the drawings, wherein like reference numbers indicate like parts throughout the several views.

Referring to FIG. 1A, shown are various perspective views of an example of a lower fork extender adapter 100. The lower fork extender adapter 100 extends from a proximal end 103 configured to engage with a lower end of a motorcycle fork leg assembly to a distal end 106 that can be configured to attach with an attachment or other ornamental or decorative piece. The proximal end 103 of the lower fork extender adapter 100 includes a tombstone shaped slot 109 configured to align with a lower end of, e.g., a Harley Davidson motorcycle fork leg.

The tombstone shaped slot 109 spans a width 112 of the lower fork extender adapter 100 at the proximal end and tapers inward as it extends along the longitudinal axis of the lower fork extender adapter 100. The slot 109 can be tapered at a proximal end to aid in alignment with the lower end of the motorcycle fork leg assembly. Axle openings 115 extend through opposite sides of the lower fork extender adapter 100 from an inner surface of the tombstone shaped slot 109 to an outer surface of the lower fork extender adapter 100.

In the example of FIG. 1A, the distal end 106 includes an end surface 118 that is substantially perpendicular to the longitudinal axis of the lower fork extender adapter 100. The end surface 118 includes one or more access openings 121 to access fasteners (e.g., nuts and/or bolts) that are used to secure a lower fork end cap around an axle of the motorcycle. The opening extends from the end surface 118 to the bottom of the tombstone shaped slot 109. The end surface 118 can also include a threaded opening 124 to allow attachment of an attachment or other ornamental or decorative piece.

Figure 1B:
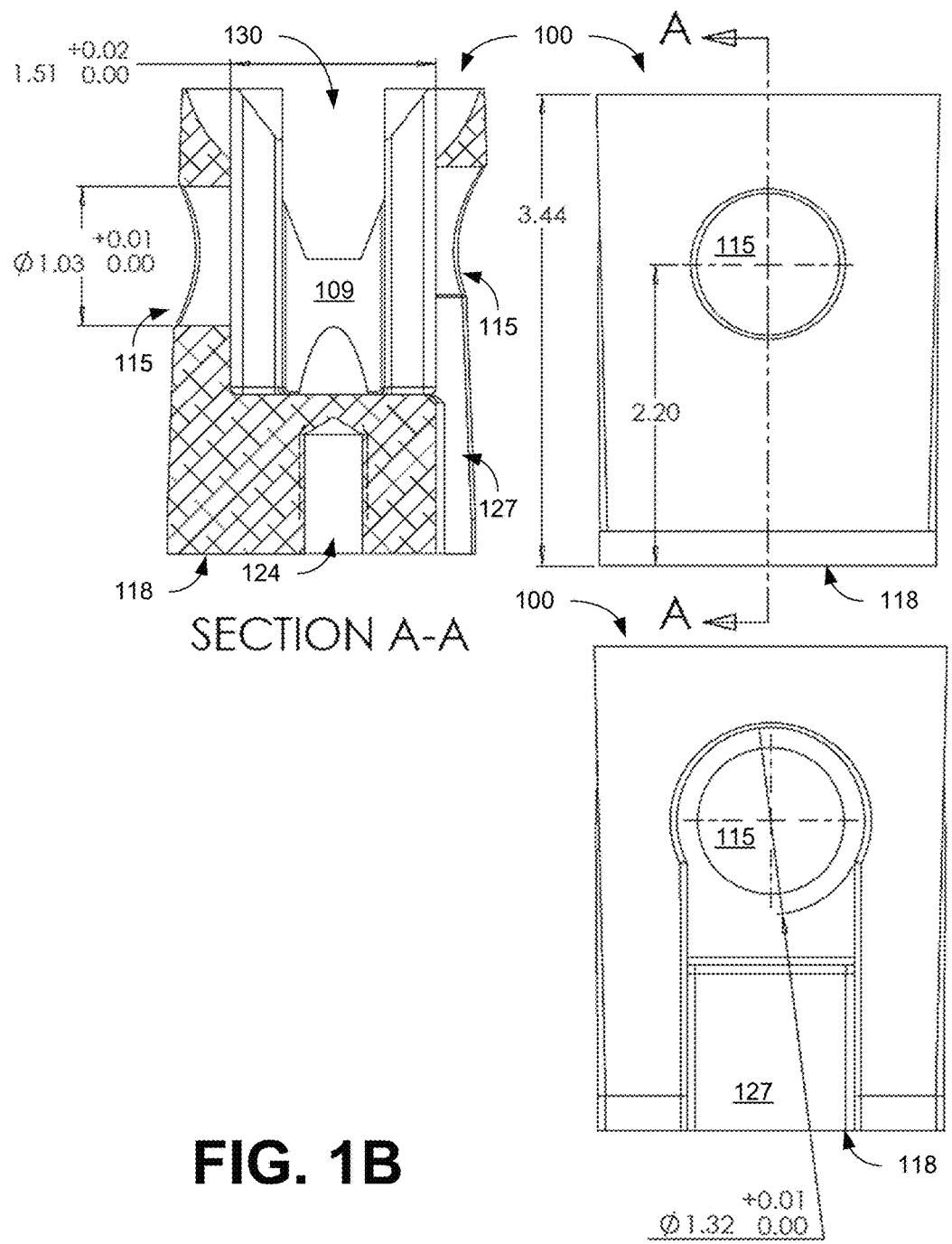

Referring now to FIG. 1B, shown are side views and a cross-sectional view (A-A) of the lower fork extender adapter 100. As can be seen in the side views, axle openings 115 extend through both sides of the lower fork extender adapter 100. The axle openings 115 are configured to receive the axle that is secured to the lower end of the motorcycle fork. A first (or outer) axle opening 115 is circular having a first diameter. A second (or inner) axle opening 115 is circular having a second larger diameter and includes a channel 127 that extends downward along the outer surface of the lower fork extender adapter 100 from the axle opening 115 to the end surface 118. As can be seen in the cross-sectional view (A-A), the channel 127 is sufficiently deep to allow the lower portion of the tombstone shaped slot 109 to be accessible through the channel 127.

The threaded opening 124 is located in the center of the end surface 118 and extends upward toward the bottom of the tombstone shaped slot 109. In some implementations, the opening 124 may not be threaded but can be configured to secure an attachment or ornament using other suitable fastening configuration.

Figure 1C:
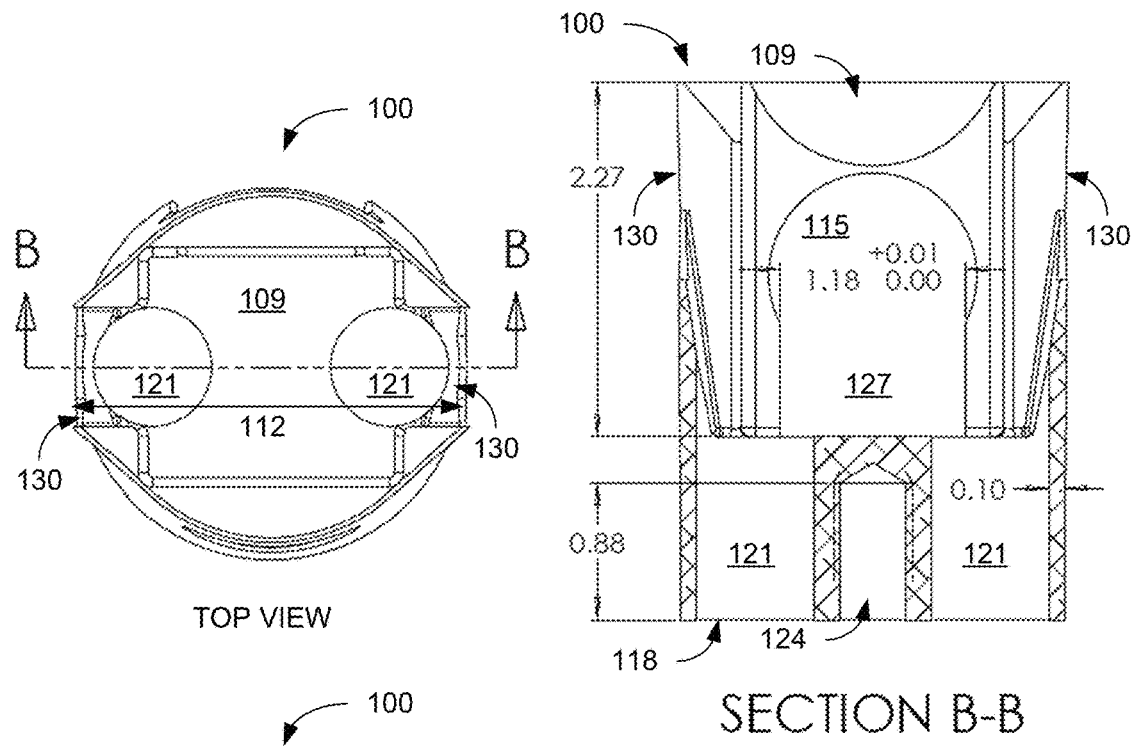

Referring next to FIG. 1C, shown are top and bottom views and a cross-sectional view (B-B) of the lower fork extender adapter 100. As seen in the bottom view, the end surface 118 can be circular (or other geometry) to match the mounting of the attachment or ornament. As illustrated, the end surface 118 can include the threaded opening (tapped hole) 124 and two access openings 121 that allow access fasteners (e.g., nuts and/or bolts) that are used to secure a lower fork end cap around the axle of the motorcycle, that extends through the axle openings 115. In the example of FIGS. 1A-1C, the threaded opening 124 does not extend into the tombstone shaped slot 109 as illustrated in the cross-sectional view (B-B), while access openings 121 do extend from the end surface 118 into the bottom of the slot 109, as shown in the top view and cross-sectional view (B-B), to allow access to the fasteners at the end of the motorcycle fork leg assembly. In other embodiments, that threaded opening 124 can extend from the end surface 118 into the bottom of the tombstone shaped slot 109.

The shape of the tombstone shaped slot 109 is configured to match the dimensions of the end of the motorcycle fork (e.g., for a Harley Davidson motorcycle). The cross-sectional views of FIGS. 1B and 1C further illustrate an example of the slot configuration. As can be seen in the cross-sectional view (B-B), a lower portion of the tombstone shaped slot 109 is enclosed by the lower fork extender adapter 100 and tapers outward from the bottom of the tombstone shaped slot 109 along the axial length of the lower fork extender adapter 100. The upper portion of the slot 109 includes open sides 130 to allow a portion of the motorcycle fork leg to extend outside the lower fork extender adapter 100.

FIG. 2A illustrates a lower fork extender adapter 100 mounted on the end of a motorcycle fork leg 203. The proximal end 103 of the lower fork extender adapter 100 is attached to the motorcycle fork leg 203 via the tombstone shaped slot 109. As can be seen, a portion of the motorcycle fork leg 203 extends beyond the outside surface of the lower fork extender adapter 100 through the open sides 130 of the slot 109. A shaft to support the wheel of the motorcycle is not shown extending through the axle openings 115. An ornamental attachment 206 is shown attached to the distal end 106 of the lower fork extender adapter 100 using, e.g., a threaded stud engaged with the threaded opening 124. FIG. 2B provides an enlarged view of the lower fork extender adapter 100 of FIG. 2A. The lower fork extender adapter 100 can be fabricated in metal, plastic or other appropriate material using CNC (computer numeric control) machining, casting, or other fabrication methods. FIG. 2C is an image of a fabricated lower fork extender adapter 100 that shows the threaded opening 124 extending into the bottom of the tombstone shaped slot 109.

Figure 3A:
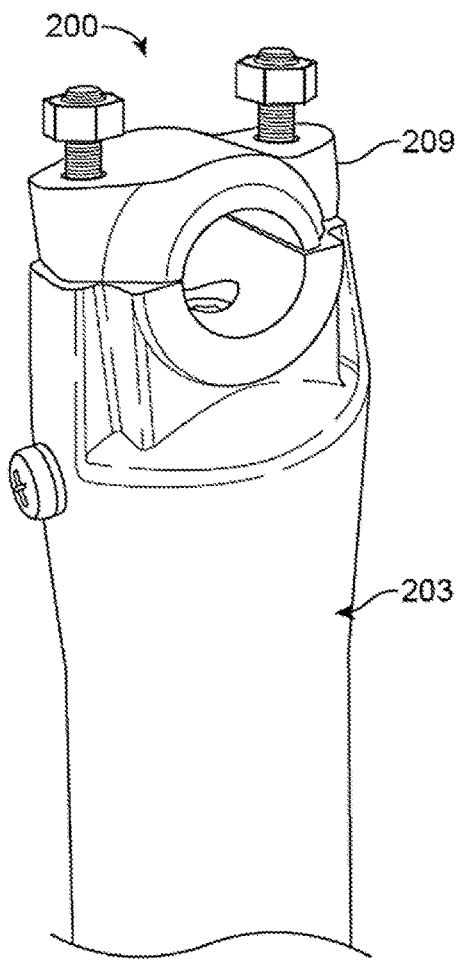
FIGS. 3A through 3E are pictures illustrating the mounting of the lower fork extender adapter of FIGS. 1A-1C on a motorcycle fork with an axle and wheel installed in accordance with various embodiments of the present disclosure.

Installation of a lower fork extender adapter 100 will now be discussed with respect to FIGS. 3A through 3E. Initially, the front axle is removed from the motorcycle forks. FIG. 3A shows the end of a cycle fork leg assembly 200, including the lower fork end cap 209 loosely secured to the motorcycle fork leg 203, with the axle removed. The motorcycle can be lifted on a motorcycle jack leaving the front wheel on the ground. Supplied O-rings can be slid onto both left and right wheel spacers, which are located on the wheel where the axle slides through the wheel.

Figure 3B:
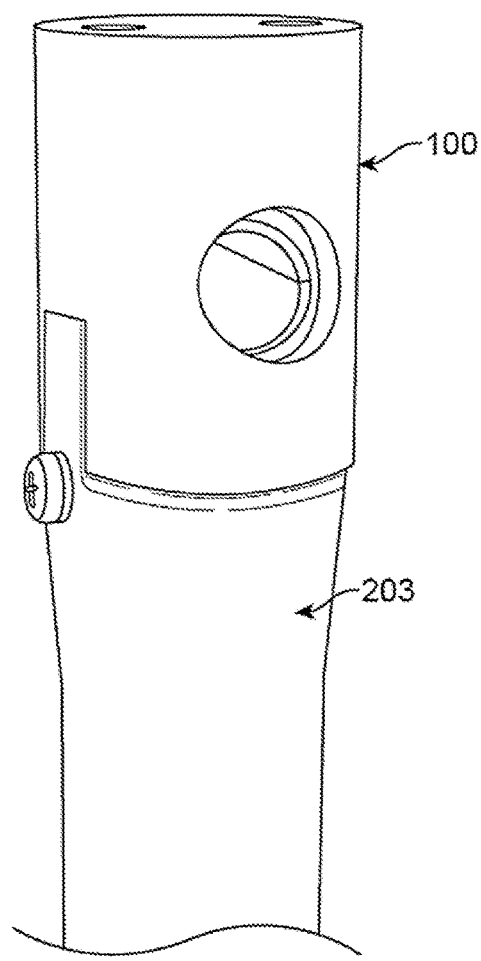

As shown in FIG. 3B, the lower fork extender adapter 100 can be installed on the lower ends of the left and/or right fork legs 203. The second (or inner) axle hole 115 and the channel 127 can be located on the inside of the motorcycle fork leg 203 when installed. The motorcycle can be lowered back onto the front wheel being cautious to ensure that the wheel spacers slide correctly upward through the channel 127 (FIGS. 1A-1C). The tombstone shaped slot 109 slides over the lower fork end cap 209 and the end of the cycle fork leg 203, aligning with the contours of these components. A removable end cap 209 can be located on only one side of the motorcycle fork. The other side of the motorcycle fork can include a hole with no removable end cap 209. It should be noted that the O-ring should be pushed away from the lower fork extender adapter 100 to allow the spacer room to slide through the channel 127. The configuration of the tombstone shaped slot 109 matches the configuration of the end of the motorcycle fork leg 203 such that the axle openings 115 of the lower fork extender adapter 100 substantially align with the axle channel formed by the end of the motorcycle fork leg 203 and the lower fork end cap 209. The fasteners that secure the lower fork end cap 209 to the cycle fork leg 203 extend into the access openings 121 from the tombstone shaped slot 109, but do not extend beyond the end surface 118 of the lower fork extender adapter 100 as shown in FIG. 3B.

Figure 3C:
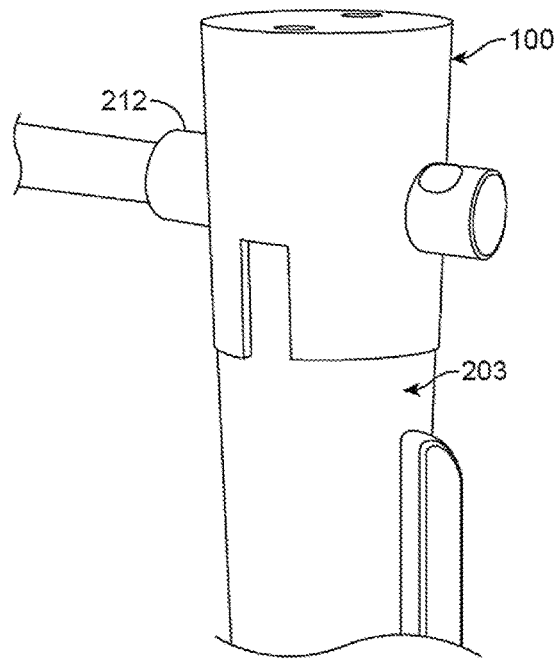
Figure 3D:
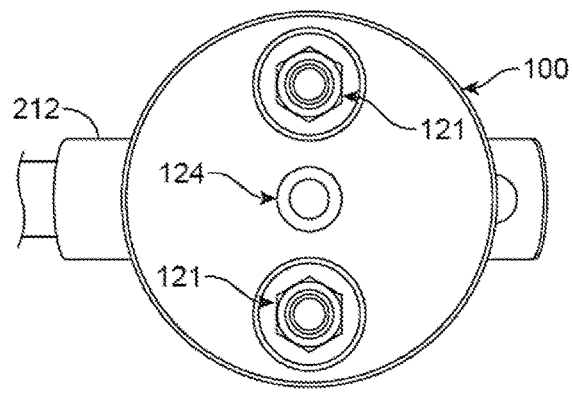

As illustrated in FIG. 3C, the front axle 212 can be reinserted through the axle openings 115 of the lower fork extender adapter 100 and between the end of the cycle fork leg 203 and the lower fork end cap 209. The fasteners can then be tightened through access openings 121 to secure the axle 212 in position. As shown in the example of FIG. 3D, nuts for securing the lower fork end cap 209 are accessible through the access openings 121. O-rings from the spacers can then be moved to inside the lower fork extender adapter 100 until they catch within the grooves on the inside diameter of the axle opening 115. This can help secure and minimize any movement on the lower fork extender adapter 100. In addition, a set screw can be inserted through the threaded opening 124 to extent beyond the bottom tombstone shaped slot 109 and press against the end of the motorcycle fork leg, the lower fork end cap 209, or against the front axle 212 (which does not turn) to aid in securing and stabilizing the lower fork extender adapter 100 in position. The length of the set screw can be chosen to allow for a threaded fastener to be secured in the threaded opening 124 to attach an attachment or other ornamental or decorative piece to the lower fork extender adapter 100.

Figure 3E:
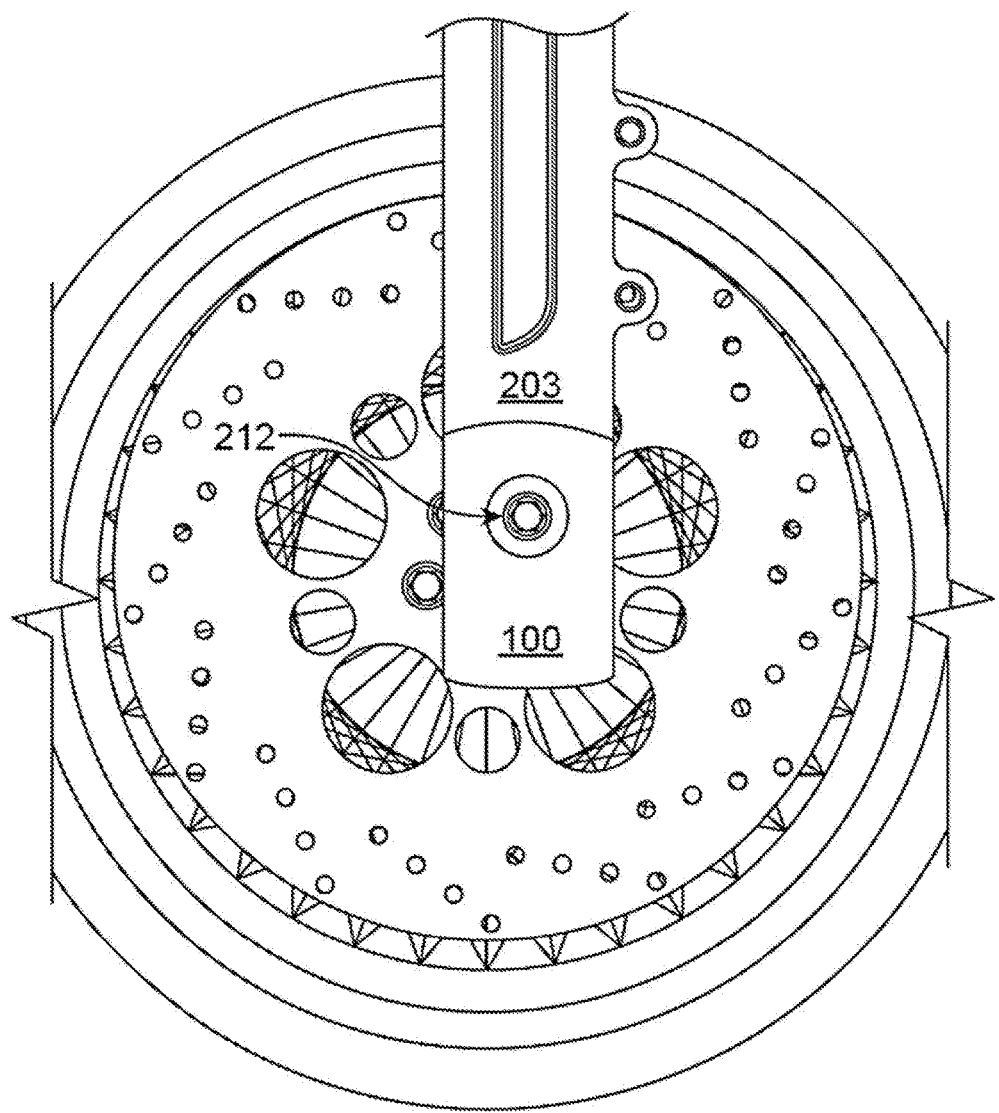

Supplied O-rings can then be slid over the axle head and the axle nut and pushed inside the lower fork extender adapter 100 until they snap into the groove on the inside diameter of the axle opening 115. FIG. 3E shows a picture of a lower fork extender adapter 100 mounted on a cycle fork leg 203 with the axle and wheel installed. An attachment or other ornamental or decorative piece can be attached to the distal end 106 of the lower fork extender adapter 100 via the threaded opening 124 as discussed. For example, a threaded (or partially threaded) fastener can be used to secure an attachment of other piece to the lower fork extender adapter 100. An attachment or ornamental or decorative piece can be secured to the threaded fastener by threading it onto the threaded fastener and/or by securing it to the threaded fastener using a set screw or other appropriate fastener.

Referring to FIG. 4A, shown is an exploded view illustrating an example of a threaded fastener 400 (e.g., a connector stud) for securing an attachment to the distal end 106 of the lower fork extender adapter 100. The threaded fastener 400 includes a threaded portion 403 configured to be secured in the threaded opening 124 on the distal end 106 of the lower fork extender adapter 100 (FIGS. 1A-1C). The threaded fastener 400 can be screwed into the threaded opening 124 until a shoulder 406 engages with the end surface 118 of the lower fork extender adapter 100. The shoulder 406 has a larger diameter than the threaded portion 403 that limits the depth that the threaded portion 403 extends into the threaded opening 124.

The threaded fastener 400 of FIG. 4A includes a non-threaded portion that extends opposite the threaded portion 403. The non-threaded portion includes a groove or channel 409 and a fastener head 412. The threaded fastener 400 can include flat spots located on opposite sides of the shoulder 406 or fastener head 412 to facilitate tightening of the threaded portion 403 in the threaded opening 124 using, e.g., a wrench. In other embodiments, the fastener head 412 can include a slot or other shaped recess (e.g., Philips, hex, square, etc.) on the distal end to facilitate tightening of the threaded portion 403 in the threaded opening 124 using, e.g., a screw driver or Allen wrench. The diameter of the fastener head 412 is larger than the diameter of the groove or channel 409 to allow a screw or clip to secure an attachment or other ornamental or decorative piece 415 to be secured to the threaded fastener 400, and thus to the lower fork extender adapter 100. The diameter of the fastener head 412 may be the same as, or less than, the diameter of the shoulder 406.

In the example of FIG. 4A, the attachment or other ornamental or decorative piece 415 can be secured in position on the threaded fastener 400 using one or more set screw 418 inserted through one or more set screw opening 421. An alignment opening 424 in the attachment or other ornamental or decorative piece 415 allows the piece 415 to be positioned over threaded fastener 400 adjacent to the distal end 106 of the lower fork extender adapter 100. The alignment opening 424 can be configured to substantially align with the fastener head 412 and extend around the shoulder 406 to allow the attachment or other ornamental or decorative piece 415 to be positioned flush against the end surface 118 of the lower fork extender adapter 100. The set screw 418 can then be screwed through the set screw opening 421 in the piece 415 and extended into the groove or channel 409 to secure the piece 415 in position on the threaded fastener 400. FIG. 4B is an image illustrating the engagement of the set screw 418 with the groove or channel 409 of the threaded fastener 400. In other implementations, a clip or other fastening device may be used to engage with the groove or channel 409 to secure the attachment or other ornamental or decorative piece 415 in position.

Figure 4C:
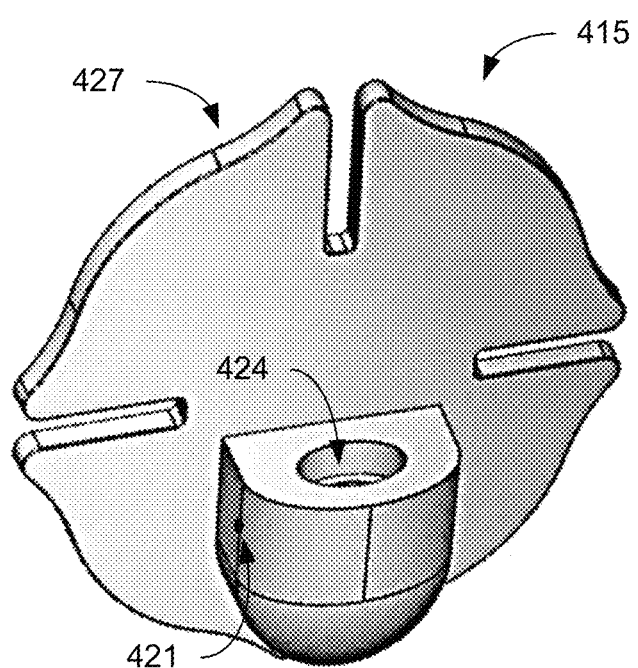

FIG. 4C shows an example of another attachment or ornamental or decorative piece 415 that includes an integrated vertical section 427 extending upward along one side of the piece 415. The vertical section 427 can be patterned and/or can include a design or logo that is visible on the outer surface of the vertical section 427 when mounted to the lower fork extender adapter 100, and can be configured to cover the end of the front axle 212 when mounted in position. The attachment or other ornamental or decorative piece 415 can be secured in position on the threaded fastener 400 using one or more set screws 418 inserted through corresponding set screw openings 421, which engages with the groove or channel 409 of the threaded fastener 400 as shown in FIG. 4B. In other implementations, a clip or other fastening device may be used to engage with the groove or channel 409 to secure the attachment or other ornamental or decorative piece 415 in position.

The threaded fastener 400 can be installed in the lower fork extender adapter 100 by coating the threads with a locking fluid (e.g., Loctite®) that can aid in securing the threaded fastener 400 in position in the threaded opening 124 and tightening it in place using an appropriate tool. The attachment or ornamental or decorative piece 415 can then be positioned over the threaded fastener 400 and one or more set screw 418 extended into the groove or channel 409 and tightened to secure the piece 415 to the lower fork extender adapter 100. A locking fluid (e.g., Loctite®) can be applied to the set screw(s) 418 to aid in securing the set screw(s) 418 in place in the set screw openings 421.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. An adapter, comprising:
    a slot extending inward from a proximal end of the adapter, the slot configured to align with an end of a fork leg assembly of a motorcycle;
    axle openings on opposite sides of the adapter, the axle openings configured to align with an axle channel of the fork leg assembly; and
    access openings extending inward from a distal end of the adapter to the slot, the access openings providing access to fasteners of the fork leg assembly.

2. The adapter of claim 1, wherein an attachment is affixed to the distal end of the adapter.

3. The adapter of claim 2, wherein the attachment is an ornamental or decorative attachment.

4. The adapter of claim 1, wherein the adapter comprises a threaded opening on the distal end of the adapter, the threaded opening centered in an end surface of the adapter.

5. The adapter of claim 4, comprising a threaded fastener secured in the threaded opening, the threaded fastener configured to attach to an attachment.

6. The adapter of claim 5, wherein the attachment comprises a set screw configured to engage with a groove of the threaded fastener to secure the attachment to the adapter.

7. The adapter of claim 1, wherein the axle openings comprise a first axle opening having a first diameter and a second axle opening having a second diameter greater than the first diameter.

8. The adapter of claim 1, wherein the fork leg assembly comprises an end cap secured to a fork leg by the fasteners of the fork leg assembly.

9. The adapter of claim 8, where an axle of the motorcycle is secured in the axle channel between the fork leg and the end cap by the fasteners.

10. The adapter of claim 8, wherein an outer surface of the proximal end of the adapter substantially aligns with an outer surface of the fork leg.

11. The adapter of claim 1, wherein the slot comprises a lower portion that tapers outward from a bottom of the slot along an axial length of the adapter and an upper portion that extends across a width of the adapter.

12. The adapter of claim 11, wherein the upper portion of the slot comprises open sides configured to allow a portion of the fork leg assembly to extend beyond an outer surface of the adapter.

13. A motorcycle comprising the adapter of claim 1 attached to a fork of the motorcycle.

14. A method, comprising:
    positioning an extender adapter on an end of a fork leg assembly of a motorcycle, the extender adapter comprising a slot extending inward from a proximal end of the extender adapter that substantially aligns with the end of the fork leg assembly;
    inserting an axle into an axle channel of the fork leg assembly, the axle extending through axle openings of the extender adapter that are substantially aligned with the axle channel of the fork leg assembly; and securing an end cap of the fork leg assembly onto the axle, the end cap secured by fasteners accessible through openings extending inward from a distal end of the extender adapter to the slot, where the fasteners do not extend beyond the distal end of the extender adapter.

15. The method of claim 14, wherein the fasteners comprise nuts secured to threaded studs extending through the end cap of the fork leg assembly.

16. The method of claim 14, comprising inserting a set screw through a threaded opening that axially extends from the distal end of the extender adapter to the slot, where the set screw is seated against the end cap of the fork leg assembly.

17. The method of claim 14, comprising securing an attachment to the distal end of the extender adapter.

18. The method of claim 17, wherein the attachment is secured to a connector stud by at least one set screw, the connector stud affixed at a center of the distal end of the extender adapter.

19. The method of claim 17, wherein the attachment comprises a vertical section that covers an outer end of the axle when secured to the distal end of the extender adapter.

20. The method of claim 14, comprising positioning O-rings in grooves located about an inside diameter of the axle openings of the extender adapter.

\* \* \* \* \*